(12) United States Patent
Pahalawatta et al.

(10) Patent No.: US 8,605,782 B2
(45) Date of Patent: Dec. 10, 2013

(54) RECONSTRUCTION OF DE-INTERLEAVED VIEWS, USING ADAPTIVE INTERPOLATION BASED ON DISPARITY BETWEEN THE VIEWS FOR UP-SAMPLING

(75) Inventors: Peshala V. Pahalawatta, Glendale, CA (US); Tourapis Alexandros, Milpitas, CA (US); Leontaris Athanasios, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 389 days.

(21) Appl. No.: 13/142,035

(22) PCT Filed: Dec. 22, 2009

(86) PCT No.: PCT/US2009/069132
§ 371 (c)(1),
(2), (4) Date: Jun. 24, 2011

(87) PCT Pub. No.: WO2010/075346
PCT Pub. Date: Jul. 1, 2010

(65) Prior Publication Data
US 2011/0254921 A1    Oct. 20, 2011

Related U.S. Application Data

(60) Provisional application No. 61/140,886, filed on Dec. 25, 2008.

(51) Int. Cl.
*H04N 7/12* (2006.01)
*H04N 11/02* (2006.01)
*H04N 11/04* (2006.01)
*H04N 11/20* (2006.01)
*H04N 13/00* (2006.01)
*G06K 9/00* (2006.01)

(52) U.S. Cl.
USPC ... 375/240.02; 348/452; 348/42; 375/240.01; 382/154

(58) Field of Classification Search
None
See application file for complete search history.

(56) References Cited

U.S. PATENT DOCUMENTS 5,677,735 A    10/1997    Ueno
(Continued)

FOREIGN PATENT DOCUMENTS

WO    2010/011557    1/2010

OTHER PUBLICATIONS

Bangchang, Purim Na, Toshiaki Fujii, and Masayuki Tanimoto. "Experimental system of free viewpoint television." Proc. of SPIE vol. vol. 5006. 2003.*
Lai, PoLin, et al. "Adaptive filtering for cross-view prediction in multi-view video coding." Electronic Imaging 2007. International Society for Optics and Photonics, 2007.*

(Continued)

*Primary Examiner* — Joseph Ustaris
*Assistant Examiner* — Rebecca Volentine

(57) ABSTRACT

Method for reconstructing interleaved views of a 3D image comprising the steps of: receiving interleaved views of a 3D image, de-interleaving said interleaved views into a first view and a second view, each de-interleaved view comprising missing pixels, at each pixel location determining an amount of disparity between said first and second views, for each view interpolating each missing pixel based on the amount of disparity determined at the associated pixel location, wherein when the determined disparity is above a predetermined disparity threshold, the missing pixel value is interpolated from the data of the view to be interpolated only (i.e. the view comprising said missing pixel value), and when the determined disparity is at or below said predetermined disparity threshold, the missing pixel value is interpolated from the data of both views.

9 Claims, 6 Drawing Sheets

(56) References Cited

U.S. PATENT DOCUMENTS

| | | |
|---|---|---|
| 7,154,557 B2 | 12/2006 | Itoh |
| 7,202,908 B2 * | 4/2007 | Zhou et al. .................. 348/452 |
| 7,304,597 B1 | 12/2007 | LaMarche |
| 8,270,472 B2 * | 9/2012 | Lai et al. ................. 375/240.02 |
| 2004/0240725 A1 * | 12/2004 | Xu et al. ...................... 382/154 |
| 2005/0117637 A1 | 6/2005 | Routhier |
| 2006/0082574 A1 * | 4/2006 | Tsubaki ...................... 345/419 |
| 2006/0132610 A1 * | 6/2006 | Xin et al. ................. 348/207.99 |
| 2006/0262856 A1 * | 11/2006 | Wu et al. ................. 375/240.19 |
| 2006/0268991 A1 | 11/2006 | Segall |
| 2007/0031065 A1 | 2/2007 | Sun |
| 2007/0091997 A1 | 4/2007 | Fogg |
| 2008/0198924 A1 * | 8/2008 | Ho et al. ................. 375/240.01 |
| 2008/0303892 A1 * | 12/2008 | Kim et al. ...................... 348/42 |

OTHER PUBLICATIONS

Hutchison, David C., "Introducing DLP 3-D TV" DLP Texas Instruments, pp. 1-5.

McCormick, et al., "Implementation of Stereoscopic and Dualview Images on a Micro-Display High Definition Television", 3DTV-Con08, May 28-30, 2008, Istanbul Turkey, pp. 33-36.

Latzel, et al., "A Robust Motion Detection and Estimation Filter for Video Signals", 2001 IEEE, pp. 381-384.

Mallat, et al., "A Review of Bandlet Methods for Geometrical Image Representation" Numerical Algorithsm, vol. 44, No. 3, pp. 205-234, Apr. 2007.

Chan, et al., "Mathematical Models for Local Nontexture Inpaintings" SIAM Journal of Applied Mathematics vol. 62, No. 3, pp. 1019-1043, 2002.

* cited by examiner

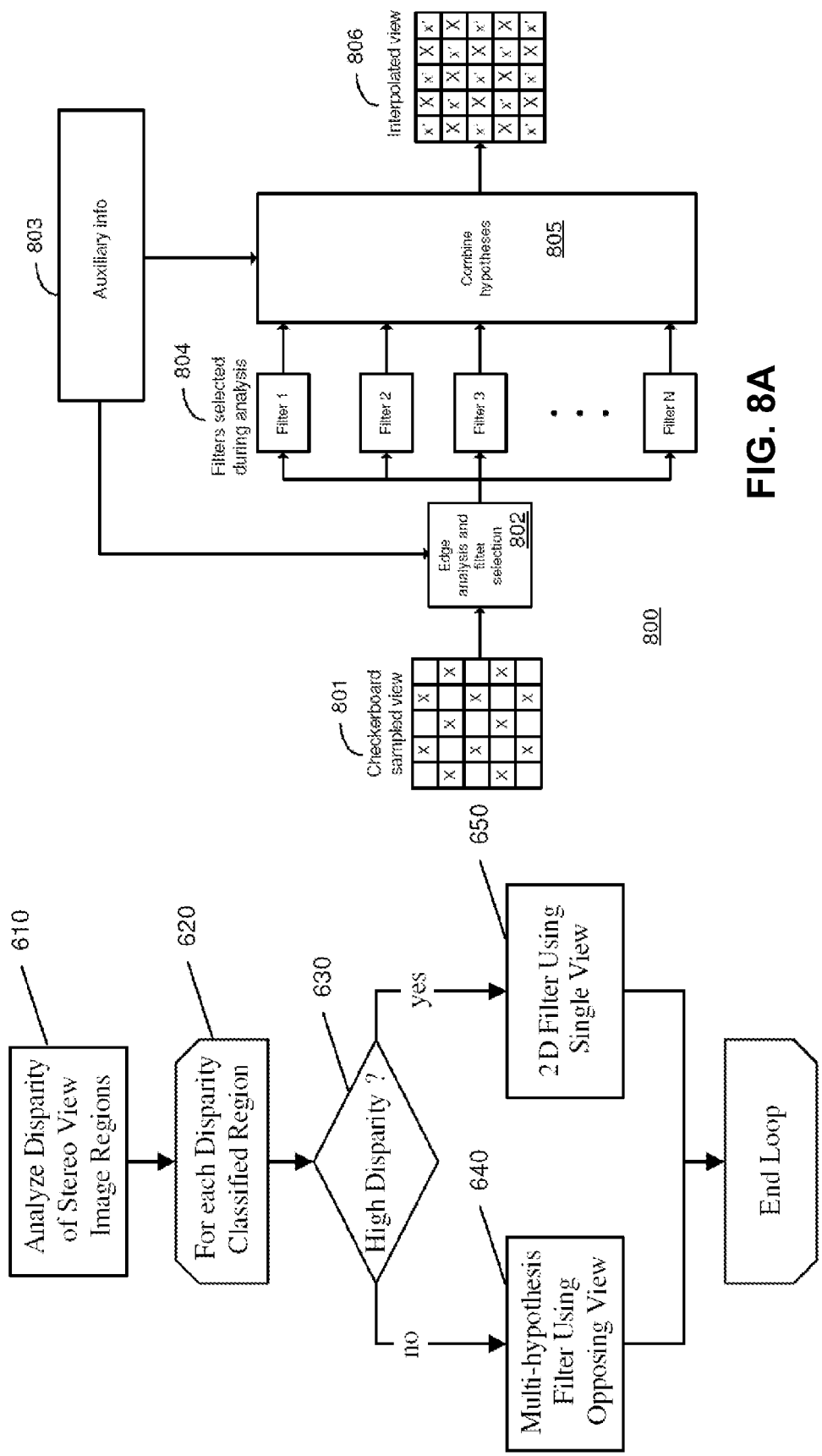

RECONSTRUCTION OF DE-INTERLEAVED VIEWS, USING ADAPTIVE INTERPOLATION BASED ON DISPARITY BETWEEN THE VIEWS FOR UP-SAMPLING

CROSS-REFERENCE TO RELATED APPLICATIONS

This application claims priority to U.S. Patent Provisional Application No. 61/140,886, filed 25 Dec. 2008, hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to data conversion, and more particularly to data upconversion, including video up-converting.

2. Discussion of Background

The delivery of stereoscopic video has been a long-held goal of content providers. Recent innovations in display technology include 3D capable DLPs and Plasma displays by Mitsubishi and Samsung. Stereoscopic video can be delivered in many different formats. One format currently utilized for the delivery of video is the checkerboard (CB) interleaved format.

SUMMARY OF THE INVENTION

The present inventors have realized the need for improving delivery of stereographic content of any format, and particularly for checkerboard interleaved formats. In one embodiment, the present invention provides a method comprising the steps of receiving a data stream containing interleaved views of at least one video stream, determining an amount of disparity between a first view and an opposing view of the interleaved views at a pixel location or in a region corresponding to the pixel location, and establishing a pixel value at the pixel location in the first view using a filter selected based on the determined disparity and the characteristics of each view. The video stream may be, for example, a 3D video where each frame comprises left and right interleaved views. The pixel value may be established in various ways, including filtering or processes that include consideration of other pixel values in the same view, other views, or temporal views.

In another embodiment, the invention provides a method of up-converting a frame of image data, comprising the steps of, dividing the frame to be up-converted into parts, upsampling each part, and combining the up-sampled parts to create an up-sampled frame.

In another embodiment, the present invention comprises a display, comprising an input configured to receive a video stream, and a frame generator configured to extract left and right images from the video stream and up-sample the extracted left and right frames based on a content adaptive interpolation. The input may comprise an HDMI input and the video stream comprises an HDMI formatted checkerboard interleaved 3D image stream.

In another embodiment, the invention may comprise a device configured to up-sample different views of an image and comprising a content adaptive interpolator. The content adaptive interpolator may comprise, for example, a disparity analysis module utilized to determine an interpolation process for at least part of one of the views.

These and other embodiments are more fully described in detail below. Portions of the devices, methods, and other embodiments of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a flow chart illustrating a process of disparity dependent filtering of stereoscopic image regions according to an embodiment of the present invention;

FIG. 8A is a diagram illustrating a general multi-hypothesis filtering for view interpolation according to an embodiment of the present invention;

DESCRIPTION OF THE PREFERRED EMBODIMENTS

Figure 1:
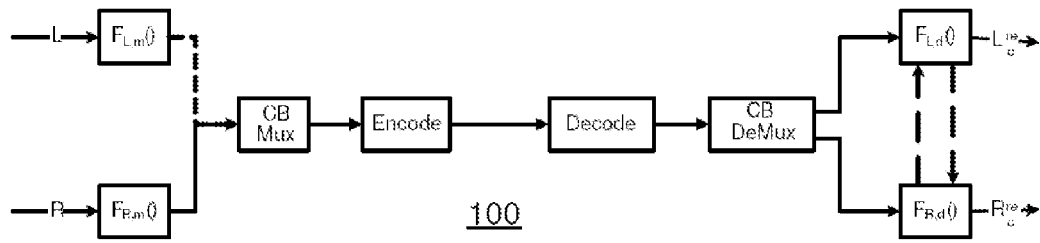
FIG. 1 is a block diagram of an overview of a system for checkerboard interleaved delivery of compressed stereoscopic images and the subsequent decoding and display of the de-interleaved stereo views according to an embodiment of the present invention.

Referring now to the drawings, wherein like reference numerals designate identical or corresponding parts, and more particularly to FIG. 1 thereof, there is illustrated an overview of a system used for checkerboard interleaved delivery of compressed stereoscopic images and the subsequent decoding and display of the de-interleaved stereo views. The delivery pipeline comprises filtering, $F_{L,d}(\ )$ and $F_{R,d}(\ )$ and downsampling the left and right views, and then multiplexing the views. The multiplexed images are then compressed using a compression scheme such as, but not limited to, ISO MPEG-4 AVC/ITU-T H.264, MPEG-2, VC1, etc., and transmitted to the decoder. The multiplexed and compressed images are then decompressed, demultiplexed, and up-converted back to full resolution using filters, $F_{L,d}(\ )$ and $F_{R,d}(\ )$.

Figure 2:
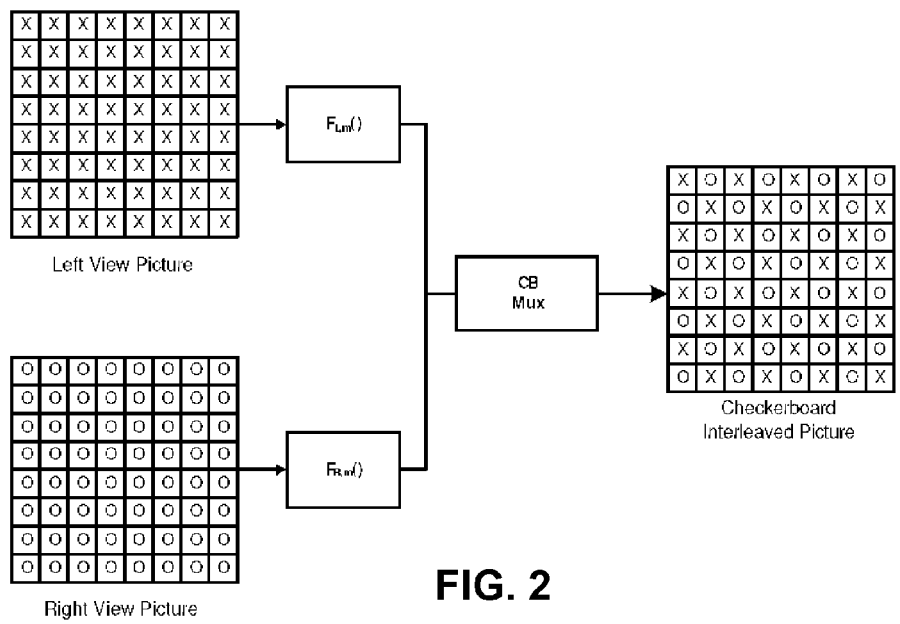
FIG. 2 is a diagram illustrating an example of downsampling and multiplexing performed by checkerboard interleaving.
Figure 3:
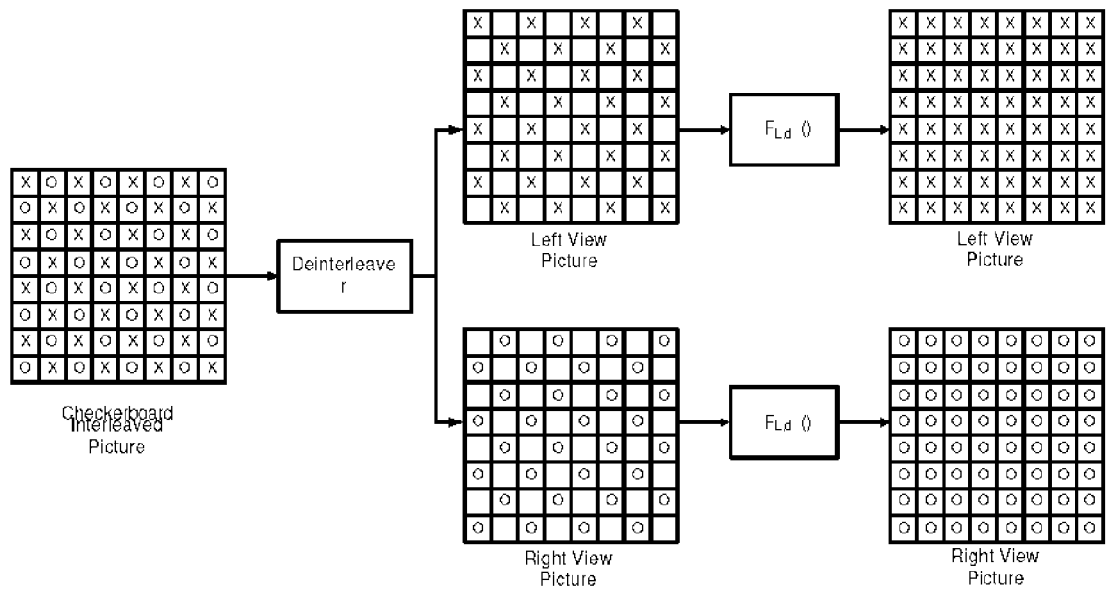
FIG. 3 is a diagram illustrating stereo view reconstruction of a pair of checkerboard interleaved images according to an embodiment of the present invention.

The downsampling and multiplexing performed by the checkerboard interleaving scheme are further illustrated in FIG. 2. The demultiplexing and upconversion are illustrated in FIG. 3. Improving the quality, but at the same time maintaining or lowering the complexity of the upconversion process are desirable since the upconversion may need to occur in real time at the decoder or display device.

The present invention comprises, for example, adaptive (e.g., content-adaptive) interpolation techniques that can be used for upsampling the checkerboard sampled images of each view. One such technique is to combine information from the view that is being up-sampled with information from the opposing view. This will be most effective when the region that is being interpolated belongs to a low disparity region of the image (i.e., left and right view images are mostly alike).

Figure 4:
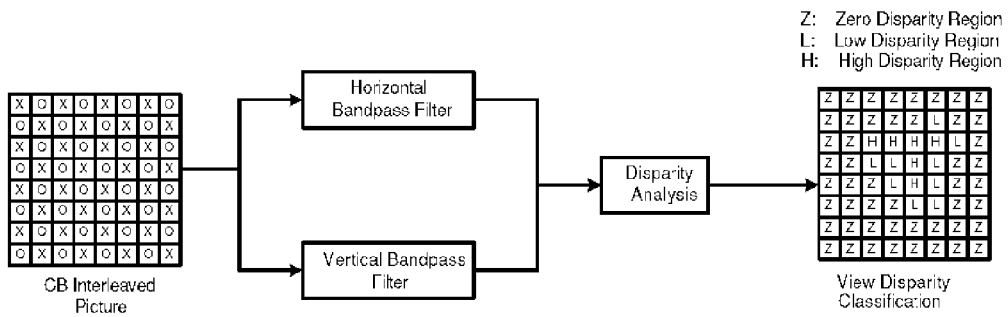
FIG. 4 is a diagram illustrating view disparity classification using bandpass filtering according to an embodiment of the present invention.

Therefore, in various embodiments, a disparity analysis can be performed for a given region of the two views. One method for disparity analysis can be derived from motion detection and estimation. In one example, a horizontally oriented bandpass filter with a characteristic frequency of (1/horizontal pixel distance) is used to detect artifacts induced by horizontal interleaving. A vertically oriented bandpass filter could also be used to detect artifacts induced by vertical interleaving. The filter, for example, can be a standard bandpass filter, such as ([−1 1 −1 1 −1 1 −1]) multiplied by a Hamming window ([1 2 3 4 3 2 1]) such that samples further away from the filtered sample are given lower weight. If the filter leads to a large response, that indicates the existence of artifacts due to interleaving. According to an embodiment of the invention, as illustrated in FIG. 4, in the case of checkerboard sampling, filtering a checkerboard interleaved image in both or one of the horizontal and vertical directions with a bandpass filter can be used to identify disparity. If one or both directions yield significant filter responses, that would imply the presence of interleaving artifacts such as a checkerboard pattern. This would indicate a large disparity between samples in the left and right views in the filtered region.

In another embodiment, a diagonally oriented filter can be used for the same purpose, and in another embodiment, a 2D filter that is sensitive to patterns caused by checkerboard interleaving can be used for the purpose. For example, a separable filter can be created by windowing the standard bandpass filter given above with a Gaussian window. Other spatial and frequency domain techniques for the detection of interleaving artifacts can also be adapted to disparity detection in checkerboard interleaving by considering the horizontal as well as vertical dimension.

Figure 5:
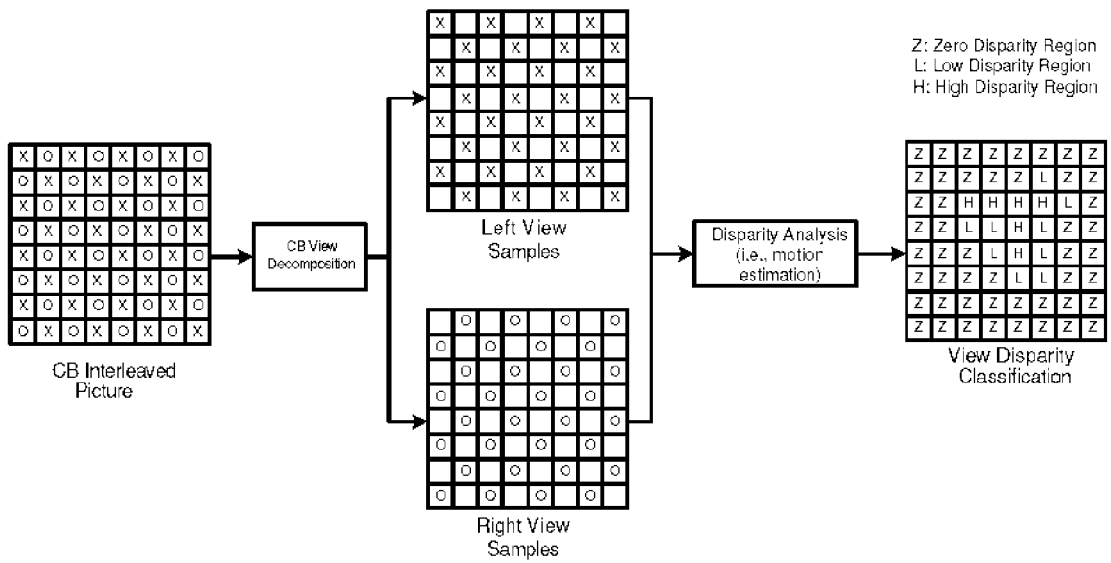
FIG. 5 is a diagram illustrating view disparity classification based on motion analysis according to an embodiment of the present invention.

In yet another embodiment, disparity analysis may be performed by motion adaptive or motion compensation based methods given the two de-interleaved views using as references already available, e.g. decoded, pictures that may correspond to either view (as illustrated in FIG. 5). Higher distortion or the presence of larger motion vectors can indicate the presence of larger disparity. Different processing can then be performed given this analysis. In still yet another embodiment, the motion estimation may be followed by a motion/disparity compensation step in which the opposing view is overlaid on the current view to be interpolated after removing the disparity between the views.

In a certain embodiment, if the disparity estimation determines that the disparity in corresponding regions that belong to the two views is of level "LA", then an interpolation mechanism of type "FA" is performed. Similarly for level "LB", "LC" etc, interpolation mechanisms of type "FB", "FC" etc would be applied respectively. For each of a number of predetermined levels of disparity, a specific corresponding interpolation mechanism is utilized. In one embodiment, the interpolation mechanism is an algorithm that is adjusted based on at least one parameter of the image data (e.g., disparity between left and right views).

As an example, if the disparity estimation determines that the disparity between the two views is low, then simple filtering techniques can be used to up-convert the de-interleaved views. A multi-hypothesis method for the interpolation of one view can also be performed using information from an opposing view at the same and/or previous instances known to be of low disparity. As illustrated in FIG. 6, a process of disparity dependent filtering of stereoscopic image regions comprises a multi-hypothesis filter 640 for interpolation when disparity is not high. The process comprises, for example, an analysis of stereo view (or other) image regions (step 610). In each region (loop 620), if high disparity is present a 2D or simpler filter is utilized (step 650) for interpolation. Alternatively, if high disparity is not present, a multi-hypothesis filter using an opposing (or alternate) view or a more complicated interpolation is utilized (step 640).

Figure 7B:
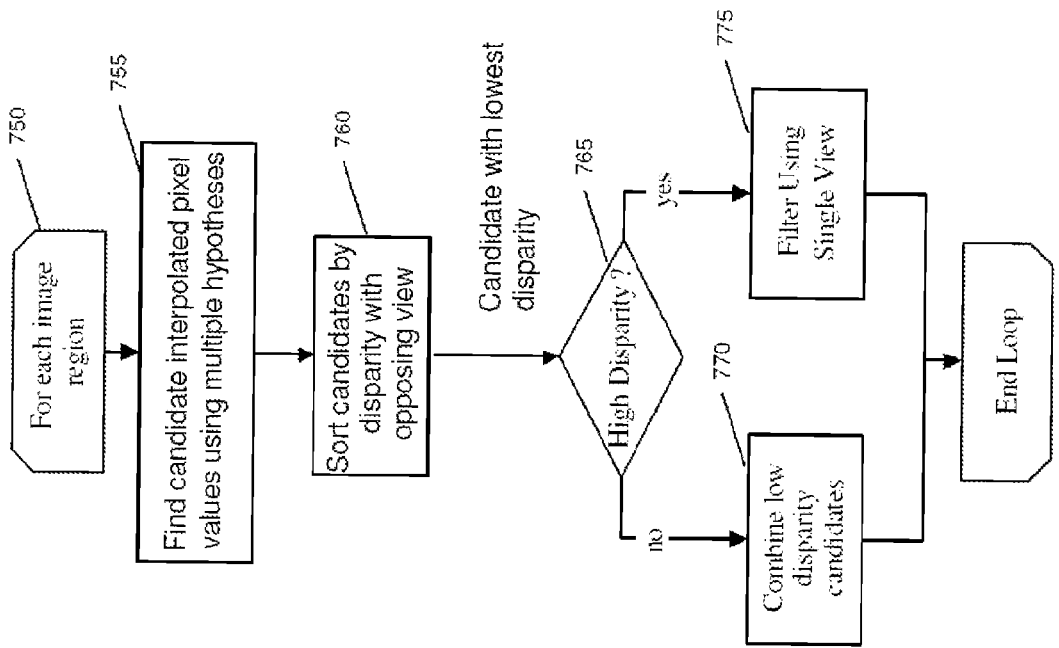
FIG. 7B is a flow chart illustrating an alternative process utilizing a multi-hypothesis filter and disparity analysis according to an embodiment of the present invention.
Figure 7A:
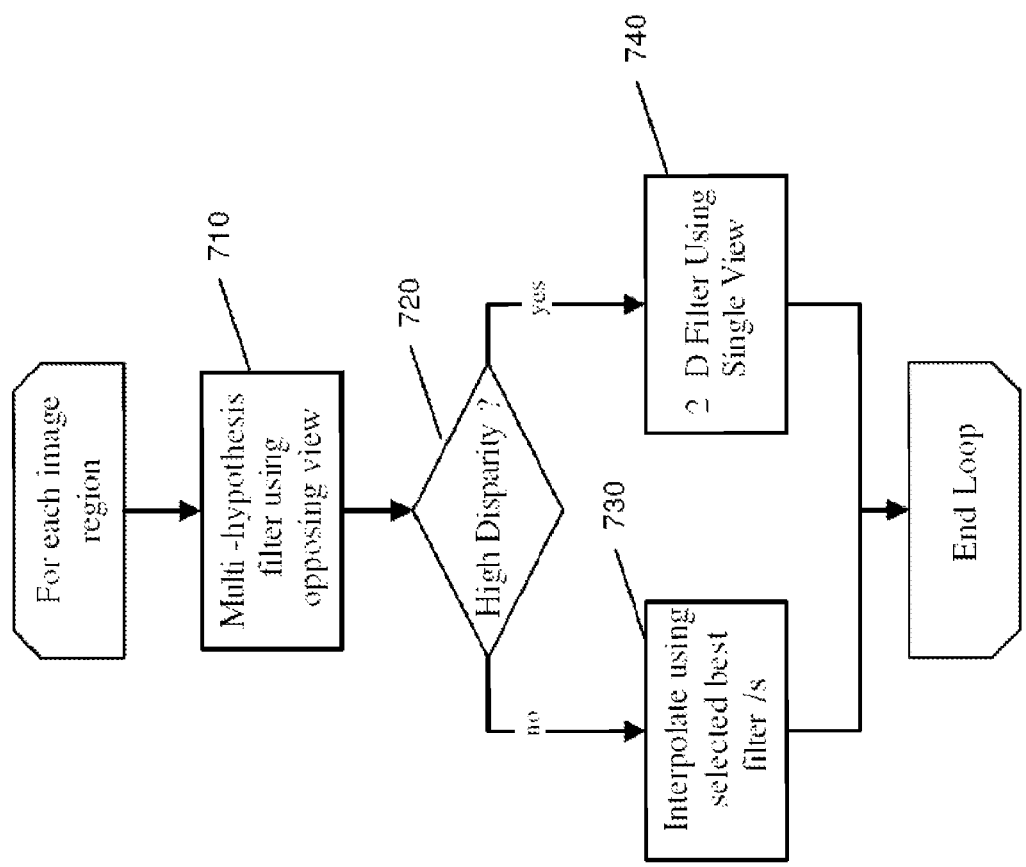
FIG. 7A is a flow chart illustrating a process of combined multi-hypothesis filter and disparity analysis according to an embodiment of the present invention.

In another embodiment, illustrated in FIG. 7A, a combined multi-hypothesis filter 710 is utilized to determine disparity. In high disparity views, the multi-hypothesis filtering will likely produce values consistent with the amount of disparity. At step 720, if the multi-hypothesis result indicates high disparity, a 2D or other filter (step 740) may be utilized, and, if the result indicates low disparity, then a selected best filter may be utilized (step 730). Previously interpolated views of the same parity could also be considered. In yet another embodiment a multi-hypothesis filter may be utilized to determine disparity and another multi-hypothesis filter may be utilized to interpolate.

FIG. 7B is a flow chart illustrating an alternative process utilizing a multi-hypothesis filter and disparity analysis according to an embodiment of the present invention. A loop 750 is set up to examine, for example, regions of a view. A candidate pixel value is determined using multiple hypotheses 755. The candidates or pixel value results of the hypotheses are sorted, for example, by disparity from another view (e.g., opposing view) (step 760). The lowest disparity candidate is then compared for high/low disparity (e.g., above or below a disparity threshold) (step 765). If the lowest disparity candidate exhibits low disparity, then, for example, a combination of the lowest available disparity candidates is used to determine the pixel value (step 770). If the lowest disparity candidate exhibits high disparity, then, for example, a filter 775 using pixels from a single view is utilized to determine the pixel value (step 775).

FIG. 8A is a diagram illustrating a general multi-hypothesis filtering for view interpolation according to an embodiment of the present invention. In FIG. 8A, a multi-hypothesis system 800 comprises an edge analysis and filter selection module 801 that evaluates a current view (e.g., checkerboard sampled view 801) either independently or in combination with Auxiliary Information 803 which may include, for example, any of an opposing view, other components of the current view, temporal neighbors, etc. The evaluation results in a set of filters 804, each of which operate to produce an interpolation result, which is then combined by a combination mechanism (e.g., combine hypotheses 804). The combination may be performed in any way, averaging, weighted averaging, or selection, for example, resulting in an interpolated view 806.

Figure 8B:
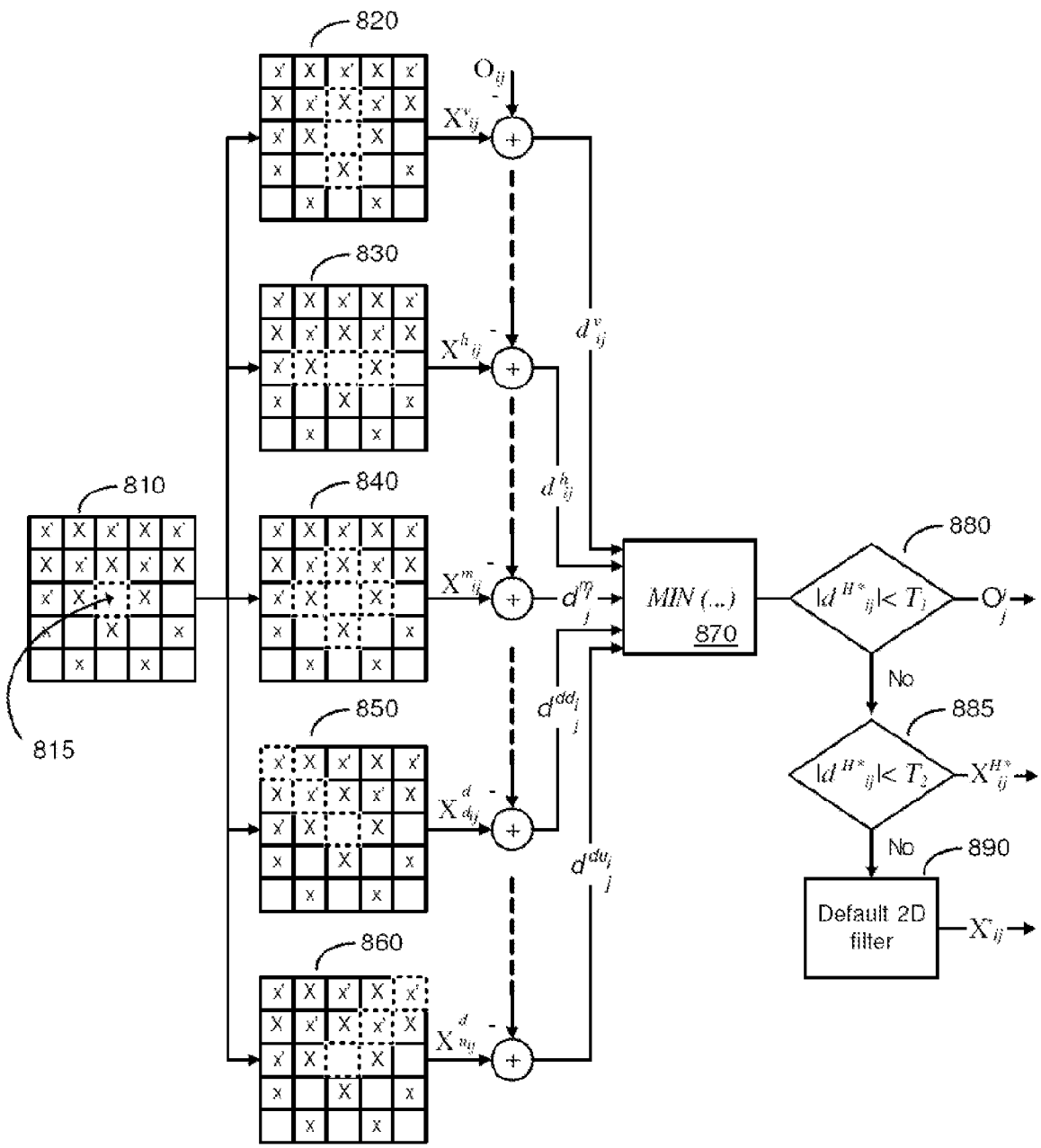
FIG. 8B is diagram illustrating multi-hypothesis filtering for view interpolation according to an embodiment of the present invention.

FIG. 8B illustrates an example of an embodiment of a multi-hypothesis interpolation filter. In FIG. 8B, the empty dotted square 815 indicates the pixel, at position (i,j) whose value needs to be estimated using the available neighborhood samples. Of the neighborhood samples, the samples denoted X are pixels that were available prior to filtering, and the samples denoted X' are pixels that have become available due to filtering in previous rows.

Note that in another embodiment, all of the samples illustrated as unavailable may already be available, and could be denoted as X' pixels due to a pre-filtering stage which estimates them, or due to an iterative process, in which the multi-hypothesis filtering is performed iteratively in multiple stages. The neighborhood of the pixel to be estimated then undergoes multiple parallel filtering steps which may include finite impulse response (FIR) separable (e.g., 1D) or non separable filters (e.g., 2D), such as vertical (e.g., 820), horizontal (e.g., 830), or diagonal interpolation filters (e.g., 850/860), cross filtering with neighborhood samples (e.g., 840), extrapolation from diagonal neighbors, etc., the illustrated being exemplary as other types of filtering may be utilized.

Note that the neighborhoods in FIG. 8 are illustratively shown as limited to the immediate neighbors, and the number of filters is also limited for purposes of clarity. However, in other embodiments, greater neighborhoods may be used enabling the use of filters with larger support sizes, and a greater diversity of filters as well. In another embodiment, the filter types used may be suggested or dictated by a prior edge analysis which determines the edge direction/strength within the filtered region of the image. The edge or other analysis may be, for example, one factor in selecting the filter utilized and/or may also be a factor of or utilized by the filter itself. Edge analysis could be based on information from the current color component being interpolated only, however it may also utilize information from other color components. Also, in yet another embodiment, filters that make use of temporal neighbors, both past and future, may also be considered (e.g., a 3D filter).

In another embodiment, filters that make use of motion adaptive or motion estimation techniques to generate motion compensated temporal predictors for the interpolation process may be considered. In another embodiment other interpolation schemes such as inpainting, wavelet, contourlet, and bandlet upsampling techniques may also be used to generate the hypotheses in the multi-hypothesis filter.

Each filter type returns, for example, a single interpolated value for the pixel (in the current example, vertical: $X_{i,j}^v$, horizontal: $X_{i,j}^h$, cross: $X_{i,j}^m$, diagonal down: $X_{i,j}^{dd}$, diagonal up: $X_{i,j}^{du}$). Then, a selection process is performed to determine the final interpolated value given these hypotheses. For example, a method that can be used for this selection process is to first derive a difference or cost/distance between each hypothesis and $O_{ij}$, which is the co-located sample in the opposing view. In a particular embodiment, this difference can be computed as:

$$d_{ij}^H = X_{ij}^H - O_{ij}, H \in \{v, h, m, dd, du, \ldots\}$$

The above difference could consider only one color component, or all color components could be considered. In this scenario, the above difference is a vector that contains the difference for all color components of a hypothesis compared to $O_{ij}$.

Then, for example, the filter with the minimum absolute difference is selected as the most likely candidate to use for the interpolation of the pixel, $H^* = \text{argmin}|d_{ij}^H|$ performed by, for example, minimum calculator 870.

In this example, if $|d_{ij}^{H^*}|$ is smaller than a threshold, $T_1$, then the pixel value can simply be copied from the co-located sample in the opposing view (i.e., $X'_{ij} = O_{ij}$, as illustrated at 880). Otherwise, if, $T_1 \leq |d_{ij}^{H^*}| < T_2$, then, in a preferred embodiment, the value of $X_{ij}^H$ that corresponds to the smallest $|d_{ij}^H|$, i.e., $X_{ij}^{H^*}$, is used as illustrated at 885. Otherwise, the filter defaults to a fixed 2D interpolator as illustrated at 890.

In another embodiment, if multiple filters provide values that are below the threshold, $T_2$, then the mean, median or a weighted mean value of $X_{ij}^H$ of all the filters that are below the threshold can be used instead of the minimum. Thus, in various embodiments, the minimum (e.g., MIN 870) may be, for example, a threshold inquiry for various filter configurations.

In one embodiment, the values from all the filters can be used to build a statistical model of the interpolated value. The value that appears to be most likely statistically, which is not necessarily below the threshold, $T_2$, can be selected as the interpolated value. The statistical likelihood can be determined by the similarity between the estimated value and the opposing view sample, as above, as well as by other means such as based on a prior edge analysis, based on filters selected for neighborhood samples, etc. For example, if an edge analysis of the image region determines that it is likely to lie on a horizontal edge, then the filter/s that perform horizontal interpolation will be more likely to provide the correct estimates.

In another embodiment, the "clustered" most likely values can be averaged together, thus avoiding the use of outliers in generating the mean estimated value, or the intermediate value prior to testing against the opposing view. The number of filters used can also be adapted based on the available system resources (power, computational complexity). If the available resources are low, then only a few simple filters can be used while if more resources are available, then more complex filters can be enabled.

In another embodiment, the multi-hypothesis filtering can be performed without any prior disparity analysis since it is likely that high disparity views will, in any case, produce values greater than the larger threshold. Such a system follows, for example, the steps illustrated in FIG. 7. In another embodiment, the values of $|d_{ij}^{H^*}|$ of the neighboring pixels can be used as a disparity estimate for the current pixel, to determine whether multi-hypothesis filtering will be useful for the current pixel.

In another embodiment, the filters selected for the interpolation of neighboring pixels can dictate the filters used, and/or the complexity of the filters used for the interpolation of the current pixel. For example, if the filter selected for the pixel at position (i,j−2) was a vertical filter then a vertical filter can also be or have priority to be tested for the pixel at position and if $|d_{ij}^v|<T_2$, then no other filters or only filters with some vertical orientation (i.e. >45 degrees and <135 degrees) need to be tested.

In another embodiment, if the previous co-located samples, are similar to the samples in the current neighborhood of pixels, then the filters used for the previous samples can be used as predictors for the current samples. In another embodiment, the "co-located" samples and associated filters can be determined after motion compensation.

In another embodiment, disparity estimates of spatially and temporally neighboring regions can be used to reduce and/or determine the complexity of the disparity analysis of the current region. For example, disabling or enabling more complex algorithms such as motion estimated methods, frequency analysis, length of filters, etc., given a desired complexity from a previous estimate (e.g., a previous disparity estimate) and/or a current availability of resources. In yet another embodiment, disparity estimates of spatially and temporally neighboring regions can be used to determine a complexity of an interpolation performed in the current region. For example, if a frame is found to be of high disparity, then the worst case of high disparity is assumed for the next N frames and more complex interpolation techniques are used. If a frame is found to be of low disparity, then low complexity interpolation techniques are used, and a new disparity analysis is performed on the next frame. The interpolation complexity adjustments can be implemented, for example, by reducing the number of filters, avoiding complex interpolation methods such as motion compensated or motion adaptive, wavelets, bandlets, inpainting etc. The interpolation complexity adjustments may also be made separately from or in tandem with disparity (or other) analysis complexity adjustments and may also be performed with consideration to a current amount of resources available to perform those interpolations and/or disparity (or other) analysis.

The same technique can also be used within regions of an image, where the disparity of neighboring regions can determine whether a disparity analysis is performed on the current region, or not. A region could be arbitrary or be of a specific shape, e.g. square or rectangular block, triangle etc, or size, e.g. 16×16, 8×8, and 1×1. Spatial and temporal correlation with neighboring regions can also be used to determine whether a given region is likely to have the same disparity characteristics as its neighbors, as well as to predict the filters used for interpolation. In an exemplary case, pixel-wise differences from temporal and spatial neighbors can be used as a measure of the correlation with the neighbors.

Figure 9:
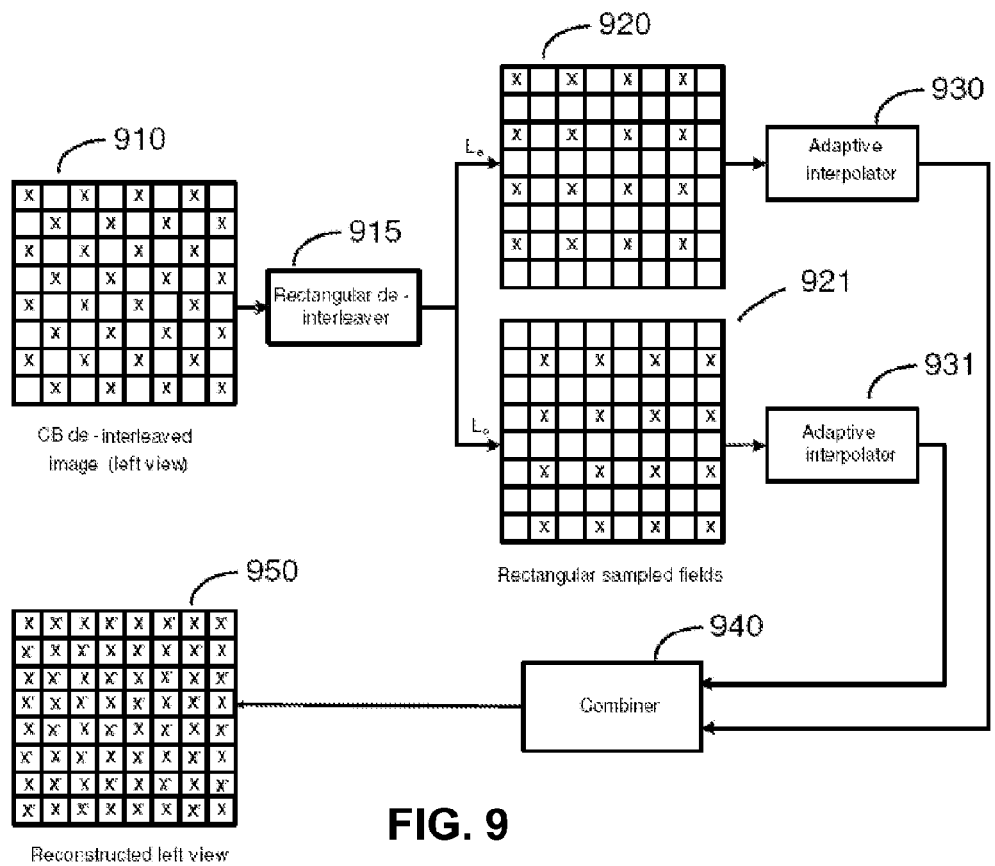
FIG. 9 is a diagram illustrating separable filtering of even and odd fields according to an embodiment of the present invention.

FIG. 9 is a diagram illustrating separable filtering of even and odd fields according to an embodiment of the present invention. A filtering technique 900 comprises, for example, separating the view to be interpolated into two rectangularly sampled fields (e.g., left view even 920 and left view odd 921) as in FIG. 9. Each field (denoted odd and even) can then be up-converted to twice its vertical and horizontal resolution using one or more of a variety of filtering techniques including 2D filters with rectangular support, separable filters, edge adaptive interpolation filters, bilinear or bicubic interpolation, inpainting, wavelet based interpolation, bandlets, ridgelets etc. The filtering shown via left odd adaptive interpolator 930 and right odd adaptive interpolator 931 can be performed in parallel for speed, but may also be configured, for example, in time multiplexed situations with sufficient processing speed so that the interpolations can be performed in real time. The results of each field can then be combined to form the final interpolated view (e.g., combiner 940, resulting in reconstructed left view 950).

Figure 10:
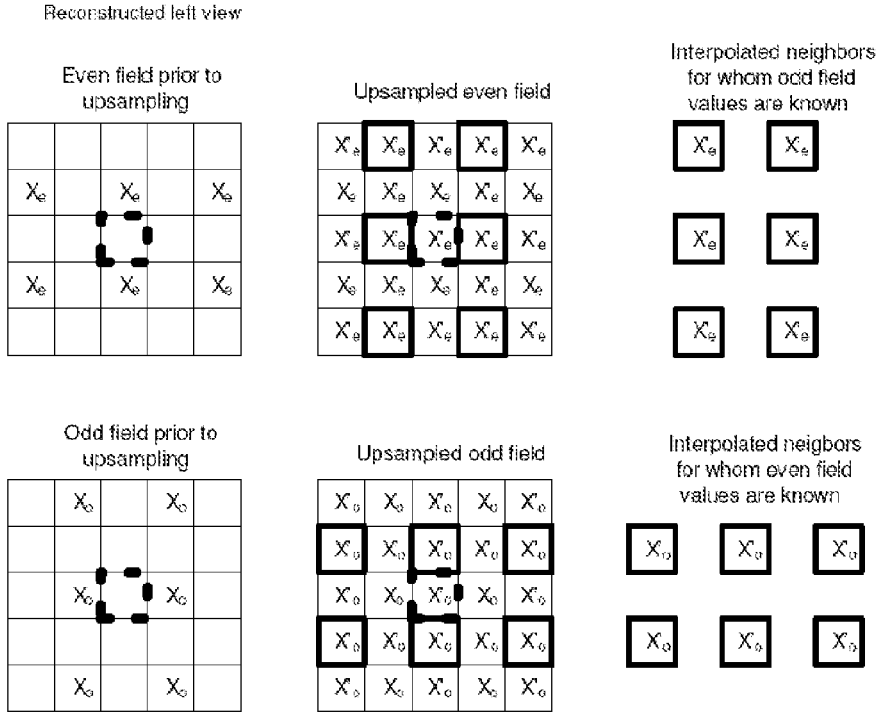
FIG. 10 is a diagram illustrating samples used to determine interpolation accuracy based on prior information available in an opposing view.

A number of techniques can be used to combine the results of each field. One method would be to take the average of the two interpolated values for each pixel. Another method is to adaptively combine the two interpolated values based on an estimate of the accuracy of the value in each field. FIG. 10 shows an example of how this may be done, and illustrates samples used to determine interpolation accuracy based on prior information available in an opposing view or field.

In FIG. 10, Xe and Xo denote available samples in the even and odd fields respectively, and X'e and X'o denote interpolated pixels in each field. Assume that the center pixel in each field (dot surrounded) is at location (i, j). Then, the final interpolated value of that pixel needs to be estimated using a combination of the even and odd field interpolated values. First, note that the samples for locations (i, j±1), and (i±2, j±1), are available, prior to interpolation, in the even field but not in the odd field, similarly, the samples at locations (i±1, j), and (i±1, j±2) are available, prior to interpolation, in the odd field but not in the even field. Therefore, the invention may utilize a measure of the difference between the interpolated values of a given field, and the actual values from the opposing field, within a neighborhood of pixels, as an estimate of the accuracy of the interpolation in the given field. The difference can be measured using a number of techniques such as sum squared difference, sum absolute difference, etc. The neighborhood region can be a fixed window, or dependent on an edge analysis of each field, or a prior edge analysis of the combined image region. The difference and process could consider only the current color component, or consider all color components that correspond to the current pixel.

Thus, in FIG. 10, an accuracy or final result of an interpolation of the (i, j) fields is determined for example by comparison or combination to an interpolation or value of the opposing field (e.g., an interpolation for field Xo (i, j), as an interpolation of Xo (i, j−1) and Xo (i, j+1), can be verified by an interpolation of Xe (i, j) which is either a known value or an interpolation of, for example, Xe (i+1, j) and Xe (i−1, j). Similarly, field values of know quantities (e.g., those spatially illustrated at 1030, may be used directly without interpolation for verification of correspondingly interpolated values in the opposing field).

Given an estimate of the accuracy of the interpolated samples from each field, the final pixel value can be formed as a weighted combination of all hypotheses from each field. In another embodiment, in addition to measuring the differences with the opposing parity field in the same view, the difference relative to the co-located pixels in the opposing view may also be used, especially, if the disparity between the views is known to be low. In another embodiment, in addition to the above estimates, the difference between interpolated samples in the current frame and co-located samples in temporally neighboring frames can be used. In another embodiment, in addition to the above estimates, the co-located samples after motion compensation of neighboring frames can be used.

Inpainting is another technique that may be employed for upsampling of the de-multiplexed views. The invention includes applying a digital total variation (TV) inpainting technique that is, for example, applied to the upsampling of compressed checkerboard de-multiplexed views. In this case, for example, assume that $\Omega$ denotes the full resolution grid on which the image function u is defined. Let $\Omega_0$ be the lower resolution subgrid determined by the checkerboard pattern of available pixels. Let $N_\alpha$ be a neighborhood defined for each pixel α in Ω. Then the total variation scheme comprises minimizing the energy $J_\lambda$ defined as, $$J_\lambda[u] = \sum_{\alpha \in \Omega} |\nabla_\alpha u| + \frac{\lambda}{2} \sum_{\alpha \in \Omega_0} (u_\alpha - u_\alpha^0)^2,$$

where, $|\nabla_\alpha u|$ is defined as, $$|\nabla_\alpha u| = \sqrt{\sum_{\beta \in N_\alpha} (u_\beta - u_\alpha)^2},$$

and $u_\alpha^0$ denotes samples that are available (i.e., samples in $\Omega_0$. The above equation minimizes the total variation (TV) subject to a fitting constraint and ensures that the interpolated values remain close to the original known values of the samples. The minimization is accomplished by iteratively applying a digital TV filter, $$u^{(n)} = F(u^{(n-1)}),$$

starting with an initial guess for $u^{(0)}$. Since the method is iterative, this invention proposes to use an accurate initial guess to speed up the convergence of the algorithm.

In one embodiment, the initial guess comprises the co-located pixels in the opposing view. In another embodiment, the initial guess comprises the co-located pixels in a disparity compensated version of the opposing view. Also, in another embodiment, the initial guess is determined using pixels obtained by temporally interpolating from previously decoded images of the current and opposing views. In another embodiment, any of the previously described interpolation methods could be used as the initial guess. In another embodiment, the image neighborhood can include temporal neighbors from the same or opposing view with or without motion/disparity compensation. Motion estimation to derive the appropriate temporal neighbors could use any motion model, with or without illumination compensation, including block based, affine, parabolic, and parametric among others. A block based motion estimation framework that could be used for this application, includes the Enhanced Predictive Zonal Search scheme.

In another embodiment, instead of using one initial guess, the process may be run using M hypotheses (e.g., M hypotheses in parallel). Hypotheses that result, for example, in the same or similar value can be collapsed into one prior to the next iteration. Also, in one embodiment, the value of λ can be determined based on the encoding parameters (e.g., quantization parameters/bitrates) used in the encoding of the checkerboard interleaved images. Note that in addition to the digital TV method, inpainting schemes such as bounded variation, Bayesian schemes, etc., may also be applied in the digital domain to the case of upsampling from a checkerboard sampled grid, where again knowledge of the pixel values in the opposing view can be used to improve the convergence of the inpainting solution.

Frequency domain filtering techniques such as wavelets, bandlets, contourlets, etc., may also be used for both downsampling and upsampling of the checkerboard sampled views. Quadrature mirror filters, for example, can be developed that perform the downsampling and upsampling in the frequency domain with minimal aliasing.

Note that the bandlet based method may be embodied similarly to the total variation technique described above, and that again the problem can be solved as an unconstrained Lagrangian minimization. An iterative process is utilized to find the solution. Again, for faster convergence, the process can be initialized using opposing view samples, temporal neighbors, motion compensated temporal neighbors, or any combination of these, and the Lagrangian parameter and the number of iterations can be determined based on the encoding parameters.

It must also be noted, that any combination of the above described filters may be used to filter a given image/sequence depending on the content characteristics of each region of the image/sequence. For example, bandlets and other inpainting techniques may be used along object edges, and regions of high texture, simpler multi-hypothesis techniques can be used in smooth regions and regions of low disparity. Filters applied on field separated filters may be used in regions of high disparity. In one embodiment, the invention comprises determining a prominent parameter of an area of an image. The prominent parameter may be, for example, an amount or type of texture in a region. Based on the prominent parameter, a filter is selected. In addition, if the downsampling filters that were used prior to the checkerboard interleaving process are known, then the upsampling filters can be adapted to the parameters of the downsampling filters.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, interpolating, varying complexities of interpolations, identifying regions, identifying and interpolating temporally related portions of images or views, determining disparity between related portions of images or views, selecting interpolation methods or processes, modifying interpolation methods or processes based on any portion of content or other factors related to the content being interpolated, implementing filters which may include, for example, performing processes or methods implementing filter functionality as described herein and/or an equivalent thereof, and the display, storage, or communication of results according to the processes of the present invention.

Various non-limiting embodiments of the invention are now provided for sake of example and illustration. For example, a method, comprising the steps of, receiving a data stream containing interleaved views of at least one video stream, determining an amount of disparity between a first view and an opposing view of the interleaved views at a pixel location or in a region corresponding to the pixel location, and establishing a pixel value at the pixel location in the first view using a filter selected based on the determined disparity and the characteristics of each view. The step of establishing a pixel value may comprise, for example, filtering with a multi hypothesis filter having hypotheses selected based on the determined disparity between the views. At least two of the views may comprise, for example, left and right channel views of a 3D motion picture. The views may comprise more than 2 views corresponding to a same scene in the video stream. The selected filter may comprise any of an interpolative filter, a filter that uses data from the view to be interpolated when the determined disparity is above a disparity threshold (the data used may comprise temporal data, e.g., temporal data from the view to be interpolated), filter that uses data from an opposing view when the disparity is at or below a disparity threshold, a multi-hypothesis filter using the opposing view when the disparity is at or below a disparity threshold, one filter within a region of high disparity and a different filter within a region of low disparity (one or both of the filters are Motion Compensated Temporal Filters (MCTF)), a multi-hypothesis filter that utilizes the opposing view (and utilization of the opposing view may comprise any one or more of basing at least part of a decision of a filter to utilize on the view to be interpolated, a weighted average including at least one pixel from the opposing view), and the multi-hypothesis filter may comprise a set of filters which consider multiple neighboring pixels (and one or more of the hypotheses may be obtained from FIR filters applied on the neighboring pixels). The use of FIR filters itself may be embodied in several different way, including, for example, wherein the FIR filters comprise one or more of horizontal filters, vertical filters, directional filters other than horizontal or vertical, separable filters, and non-separable filters, or where the FIR filters can be of varying support lengths. Filters used in the multi-hypothesis filter may comprise, for example, any one or more of wavelets, bandlets, contourlets, and inpainting. The multi-hypothesis filter may further comprise an iterative multi-stage filter, comprising an initial guess based on a co-located pixel in an opposing view. In one alternative, the multi-hypothesis filter comprises an iterative multi-stage filter, comprising an initial guess based on a co-located pixel in an opposing view determined by temporal interpolation based on at least one of motion adaptive and motion compensated methods.

The multi-hypothesis filter may be further embodied, for example, as comprising at least two of vertical filtering, horizontal filtering, temporal filtering, bilinear or bicubic filtering, nearest neighbor filtering, at least one directional filtering other than horizontal and vertical filtering, and other filters. The multi-hypothesis filter may be further embodied as, for example, comprising any of filters that have been selected based on an edge analysis of the region to be filtered, filters that have been selected based on at least one of texture or variance and motion analysis of the region to be filtered, filters that have been selected based on edge, texture, or motion analysis of the region to be filtered in color components other than the component to be filtered.

In various embodiments, any of the filters may comprise, for example, at least one filter operating on or comprising a pixel neighborhood that is specifically designed to address a deficiency caused by at least one of an interleaving scheme of the views in the data stream and a codec used on the video stream, at least one filter utilizing neighboring pixels that have become available due to a previous stage of filtering.

Determining an amount of disparity may comprise, for example, any of performing a multi-hypothesis filter and comparing a result of the filter to a value based at least in part on the opposing view, performing either a horizontal, vertical or 2D (separable, or non-separable) bandpass filter tuned to the characteristics of the interleaver, and/or performing at least one of a 4×4 DCT filter, an 8×8 DCT filter, a Hadamard filter, and other filters.

In various embodiments, filter selection may comprise any of, for example, where the selected filter is selected based on an amount of disparity wherein a $1^{st}$ filter is selected based on determination of a $1^{st}$ level of disparity, a $2^{nd}$ filter is selected based on a $2^{nd}$ level of disparity, and so on until an $n^{th}$ level of disparity where an $n^{th}$ filter is selected, where the filter is selected based on local image features, such as edges, texture, and motion, in the region corresponding to the pixel location, where the filter is selected based on local image features, such as edges, texture and motion of more than one color component in the region corresponding to the pixel location, where the selected filter comprises an interpolation based on at least one of inpainting, wavelet, contourlet, and bandlet upsampling techniques of a current view, where the selected filter comprises a weighted average of nearby pixels of a current view, where the selected filter utilizes at least one temporal neighbor of a pixel of a current view, where the selected filter comprises a weighted average of nearby pixels including nearby pixels in the opposing view, where the selected filter is based on a comparison of a result of the filter and a sample in the opposing view (e.g., the sample in the opposing view may, for example, be co-located or from a different temporal instance than the pixel value), where the selected filter comprises a filter that copies a sample in the opposing view to the pixel location of the first view.

Any of the embodiments may be realized in software, firmware, or other computer readable media/medium wherein the method is embodied in a set of instructions stored on a computer readable media in a device including a processor wherein loading and executing the stored instructions in the processor cause the processor to perform the steps of the method.

In one embodiment, the invention comprises a method of up-converting a frame of image data, comprising the steps of dividing the frame to be up-converted into two parts, upsampling each part, and combining the up-sampled parts to create an up-sampled frame. The step of dividing the frame may comprise de-interleaving the frame.

Generally utilized on interleaved frames, the step of de-interleaving may be performed, for example, via any of steps comprising use of one of row-by-row, column-by-column, even-and-odd, and other de-interleaving dividing the frame into additional parts. In one embodiment, de-interleaving comprises checkerboard de-interleaving. In one embodiment, de-interleaving comprises row-by-row followed by column-by-column.

The step of upsampling may comprise up-converting to a resolution different than the original resolution each divided part, up-converting to twice the original resolution each divided part, up-converting to four times the original resolution each divided part, and/or comprise filters comprising any one or more of filters with support for at least one of rectangular interpolation, separable filters, edge adaptive interpolation, bilinear interpolation, bi-cubic interpolation, iterative multi-stage interpolation, and/or a filter with support for at least one of motion adaptive filters, MCTF, and filters based on any one or more of wavelets, inpainting, curvelets, and bandlets. In one embodiment, the step of upsampling comprises a multi-hypothesis filter. The multi-hypothesis filter may comprise adaptively combining the filtered values from various filters based on an estimate of accuracy of each filtered value.

The step of combining the up-sampled parts may comprise, for example, any of a weighted average of corresponding up-sampled values, and adaptively combining interpolated values from each part based on an estimate of accuracy (the adaptive combining of interpolated values may comprise, for example, comprises a weighted average of the values obtained from the most accurate interpolators the estimate of accuracy).

The estimate of accuracy comprise, for example, any of a difference between interpolated values of a given field and actual values of a corresponding opposing field, a difference between interpolated values of a given field and clustered most likely values of an opposing field (the difference may comprise, for example, a sum square difference, a sum absolute difference, and other difference techniques). The fields may be determined, for example, via one of a fixed window and an edge analysis.

In one embodiment, the invention comprises a method comprising the steps of de-interleaving views, and upsampling the views using a digital total variation inpainting technique, wherein an initial guess of the inpainting technique comprises an initial guess derived from at least one of the de-interleaved views and an iterative process. The de-interleaved views may comprise, for example, a first view and an opposing view of a 3D image. The iterative process comprises a minimization of a total variation scheme subject to a fitting constraint. The minimization may be performed, for example, by application of a digital Total Variation (TV) filter. The TV filter may comprise, for example: $u^{(n)} = F(u^{(n-1)})$, starting with an initial guess for $u^{(0)}$. The initial guess may comprise, for example, a guess that takes into account a format by which the views were previously interleaved. Alternatively, the initial guess may comprise, for example, any of a guess takes into account a codec utilized on the views prior to de-interleaving, a guess that comprises at least one temporally neighboring pixel, a guess that comprises at least one co-located pixel (the co-located pixel may comprise, for example, at least one of a co-located temporal pixel of a same view, a co-located pixel in an opposing or alternate view, and a co-located temporal pixel in an opposing or alternate view), a guess comprising co-located pixels in a disparity compensated version of an opposing view, a guess comprising at least one temporally neighboring pixels in a disparity compensated version of an opposing view, a guess comprising pixels obtained via temporal interpolation of pixels in at least one of a current view and an opposing view, and an initial guess determined by interpolation.

In one embodiment, the invention may comprise a display comprising an input configured to receive a video stream, a frame generator configured to extract left and right images from the video stream and up-sample the extracted left and right frames based on a content adaptive interpolation. The input may comprise, for example, an HDMI input and the video stream comprises an HDMI formatted checkerboard interleaved 3D image stream.

In another embodiment, the invention may comprise a device configured to up-sample different views of an image and comprising a content adaptive interpolator. The content adaptive interpolator may comprise, for example, a disparity analysis module utilized to determine an interpolation process for at least part of one of the views. The disparity analysis module may comprise, for example, adjustable complexity wherein disparity estimates of at least one of spatially and temporally neighboring regions of at least part of one of the views is used to set a complexity level of the disparity analysis module. The content adaptive interpolator may also or further comprise an adjustable complexity wherein disparity estimates of at least one of spatially and temporally neighboring regions of at least part of one of the views are utilized to set a complexity level of an interpolation performed by the content adaptive interpolator. The invention may further comprise discretion when a disparity estimate is at, above, or below certain thresholds, for example, any of or more of: when above a disparity threshold the complexity level of the interpolation is set to a high complexity for a predetermined number of frames N, when a disparity estimate is above a high disparity threshold in one region, the complexity level of the interpolation is set to a high complexity for that region and all spatially and/or temporally neighboring regions up to a specified neighborhood, when a disparity estimate is below a low disparity threshold, the complexity level of the interpolation is set to a low complexity for a predetermined number of frames M, when a disparity estimate is below a low disparity threshold in one region, the complexity level of the interpolation is set to a low complexity for that region and/or all spatially and temporally neighboring regions up to a specified neighborhood, when a disparity estimate is within a specified range in one region, the complexity of the interpolation for that region and all spatially and/or temporally neighboring regions up to a specified neighborhood are set to a level corresponding to the disparity estimate. In addition, a complexity of the interpolation for at least part of one of the views may be set to one of high and low based on a correspondingly high or low disparity estimate, and the set complexity of the interpolation for at least part of one of the views may remain in effect without further disparity estimates of the part for N frames.

In various embodiments, the different views may comprise, for example, any of: left and right views of a 3D image, different views of a same scene, and different scenes. Further, the content adaptive interpolator is configured to select an interpolation scheme to be utilized to up-sample at least one view of the image based on an analysis of both views (the analysis of both views may comprise, for example, a disparity analysis, e.g., a disparity analysis between the views). The disparity analysis may comprise, for example, any of a filter and a weighting mechanism, at least one of a horizontal filter, vertical filter, diagonal filter, and a filter sensitive to patterns caused by an encoding technique used on the views, a determination of scale of motion vectors via at least one of motion estimation analysis and motion compensation analysis between the views, and a consideration of previously interpolated views of a same parity. A sample in an area having low disparity between views may be up-sampled, for example, using data from the opposing view.

The content adaptive interpolator may be constructed, for example, any of: to select one of n interpolations based on a level of disparity between the views such that if a first level of disparity occurs, a first interpolation is performed, if a second level of disparity occurs, then a second interpolation process is performed, and so on, to an nth level of disparity and corresponding nth interpolation, initiate an interpolation that varies based on a level of disparity between views in an area of a pixel being interpolated. A first level of disparity may comprise a low disparity area and the first interpolation may comprise a simple filtering technique to up-convert corresponding pixels in the views, and progressively more complex filtering techniques for areas of higher disparity.

In various embodiments, the content adaptive interpolator may comprise a construction that interpolates iteratively in multiple stages. Later stages of the interpolator may make use of interpolated data generated in an earlier stage. The content adaptive interpolator may utilize filter types selected based on an edge analysis in an area of an image being interpolated. The content adaptive interpolator may consider, for example, at least one temporal neighbor of a pixel being interpolated. The type of interpolation utilized may include, for example, at least one of inpainting, wavelet, contourlet, and bandlet upsampling.

In various embodiments, the interpolation performed may comprise, for example, a multi-hypothesis interpolation wherein a result of each hypothesis as to a filtered pixel is compared against a co-located pixel in an opposing view to determine a filter technique to be used on the filtered pixel. A difference between a result of each hypothesis and the co-located pixel may be compared against a second threshold, and, if multiple filters provide values below the threshold, an arithmetic combination of the below threshold filter results may be utilized as the interpolated pixel. The arithmetic combination may comprise, for example, one of a mean, and a weighted mean value of all filters below the threshold. In various embodiments, any of the following occurs, if a difference between a result of a hypothesis and the co-located pixel is below T1, the co-located pixel is copied as the interpolated pixel, or, when a difference between results of more than one hypothesis and the co-located pixel is between a first threshold T1 and a second threshold T2, the result with the minimum difference value between T1 and T2 is utilized for the interpolated pixel value, or, when a difference between a result of more than one hypothesis and the co-located pixel is above T2, a default 2D filter is applied on data of the view to be interpolated.

In yet another embodiment, the invention comprises a computer readable media and a set of instructions stored by the computer readable media that, when loaded into a computer, cause the computer to perform the steps of, receiving a data stream containing interleaved left and right channel views of a 3D motion picture, determining an amount of disparity between a first view and an opposing view of the interleaved views at a pixel location or in a region corresponding to the pixel location, and establishing a pixel value at the pixel location in the first view using a filter selected based on the determined disparity. Any method or process described herein may be embodied in a set of computer instructions stored on a computer readable media, and, said computer instructions, when loaded into a computer, cause the computer to perform the steps of said method. The computer instructions may be compiled computer instructions stored as an executable program on said computer readable media. The computer readable media may be, for example any of, for example, a component of a Blu-Ray player, and a component of a 3D ready display.

The present invention may suitably comprise, consist of, or consist essentially of, any of element or feature of the invention and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed:

1. A method, comprising the steps of:
   receiving a data stream containing interleaved left and right channel views of a 3D video stream;
   de-interleaving the 3D video stream to extract the left and right channel views;
   up-sampling the left and right channel views, comprising the steps of:
   determining an amount of disparity between the left and right channel views at a pixel location or in a region corresponding to the pixel location; and
   selecting at least one filter from a set of filters to interpolate a missing pixel value at the pixel location in one of the left and right channel views, wherein the filters from the set of filters correspond to different interpolation schemes,
   wherein the at least one filter is selected based at least on the determined disparity such that,
   when the determined disparity is at or below a disparity threshold, the at least one selected filter interpolates the missing pixel value either from data of both views or from data of only the other view, and
   when the determined disparity is above the disparity threshold, the at least one selected filter interpolates the missing pixel value from data of only the view to be interpolated.

2. The method according to claim 1,
   wherein, when the determined disparity is at or below the disparity threshold, the at least one selected filter interpolates the missing pixel value from data of only the other view.

3. The method according to claim 1, wherein the data comprises temporal data from the view to be interpolated.

4. The method according to claim 1, wherein one or more of the selected filters are Motion Compensated Temporal Filters (MCTF).

5. The method according to claim 1, wherein the set of filters comprises a filter which considers multiple neighboring pixels.

6. The method according to claim 5, wherein the at least one filter that is selected when the determined disparity is at or below the disparity threshold is a FIR filter applied on the neighboring pixels.

7. The method according to claim 1, wherein the at least one filter that is selected when the determined disparity is at or below the disparity threshold is an iterative multi-stage filter, comprising an initial guess based on a co-located pixel in the other view determined by temporal interpolation based on at least one of motion adaptive and motion compensated methods.

8. The method according to claim 1, wherein at least one of the filters comprises a pixel neighborhood that is specifically designed to address a deficiency caused by at least one of an interleaving scheme of the views in the data stream and a codec used on the video stream.

9. A device configured to up-sample different left and right views of an image and comprising a content adaptive interpolator,
- wherein the content adaptive interpolator is configured to select at least one interpolation scheme to be utilized to up-sample at least a first view of the image based on an analysis of the first view and a second view of the image,
- wherein the content adaptive interpolator comprises a disparity analysis module utilized to determine an interpolation scheme from a plurality of different interpolation schemes for interpolating a missing pixel value at a pixel location based at least on a determined amount of disparity between the first view and the second view at the pixel location or in a region corresponding to the pixel location such that,
- when the determined disparity is at or below a disparity threshold, the content adaptive interpolator determines an interpolation scheme that interpolates the missing pixel value in the first view either from data of both views or from data of only the second view, and
- when the determined disparity is above the disparity threshold, the content adaptive interpolator determines an interpolation scheme that interpolates the missing pixel value in the first view from data of only the first view.

* * * * *